(12) United States Patent
Yanagawa et al.

(10) Patent No.: US 7,948,844 B2
(45) Date of Patent: May 24, 2011

(54) INFORMATION RECORDING/REPRODUCING DEVICE AND THE LIKE

(75) Inventors: Naoharu Yanagawa, Tokorozawa (JP); Akira Shirota, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 534 days.

(21) Appl. No.: 12/065,699

(22) PCT Filed: Sep. 5, 2006

(86) PCT No.: PCT/JP2006/317502
§ 371 (c)(1),
(2), (4) Date: May 7, 2008

(87) PCT Pub. No.: WO2007/029674
PCT Pub. Date: Mar. 15, 2007

(65) Prior Publication Data
US 2009/0103405 A1   Apr. 23, 2009

(30) Foreign Application Priority Data
Sep. 5, 2005   (JP) ................. P2005-256970

(51) Int. Cl.
*G11B 15/52*   (2006.01)
(52) U.S. Cl. ..................................... 369/47.5
(58) Field of Classification Search ............ 369/47.5, 369/47.55, 47.51
See application file for complete search history.

(56) References Cited

U.S. PATENT DOCUMENTS

| | | | | |
|---|---|---|---|---|
| 2003/0185121 A1* | 10/2003 | Narumi et al. | | 369/47.53 |
| 2005/0094512 A1* | 5/2005 | Sakai et al. | | 369/47.5 |
| 2006/0002254 A1* | 1/2006 | Ishihara et al. | | 369/44.32 |

FOREIGN PATENT DOCUMENTS

| | | |
|---|---|---|
| JP | 2001-148133 | 5/2001 |
| JP | 2002-117542 | 4/2002 |
| JP | 2002-279634 | 9/2002 |
| JP | 2006-268964 | 10/2006 |

OTHER PUBLICATIONS

English translation of Japanese Patent Publication JP2001-148133.*

* cited by examiner

*Primary Examiner* — Joseph Haley
*Assistant Examiner* — Nicholas Lee
(74) *Attorney, Agent, or Firm* — Drinker Biddle & Reath LLP

(57) ABSTRACT

An information recording/reproducing device which can record or reproduce the predetermined information quickly and properly is proposed.

An information recording/reproducing device 10 detects recording condition of an area in radial direction of an optical medium 2 using the rotation angle in a layer 0 as a standard when recording given data in a layer 1 of the optical medium 2 and on the basis of the detection result, controls power of laser beam irradiated on the layer 1 to record or reproduce given recording data.

10 Claims, 10 Drawing Sheets

FIG. 9

| RADIAL POSITION INFORMATION (TRACK) | ROTATION ANGLE TO CHANGE RECORDING POWER | | AMOUNT OF CHANGE OF REFLECTION RATIO |
|---|---|---|---|
| | FROM | TO | |
| TRACK NUMBER = a | 170 DEGREE | 190 DEGREE | 30 % |
| TRACK NUMBER = a + 1 | 160 DEGREE | 200 DEGREE | 30 % |
| TRACK NUMBER = a + 2 | 150 DEGREE | 210 DEGREE | 30 % |
| TRACK NUMBER = a + 3 | 140 DEGREE | 220 DEGREE | 30 % |

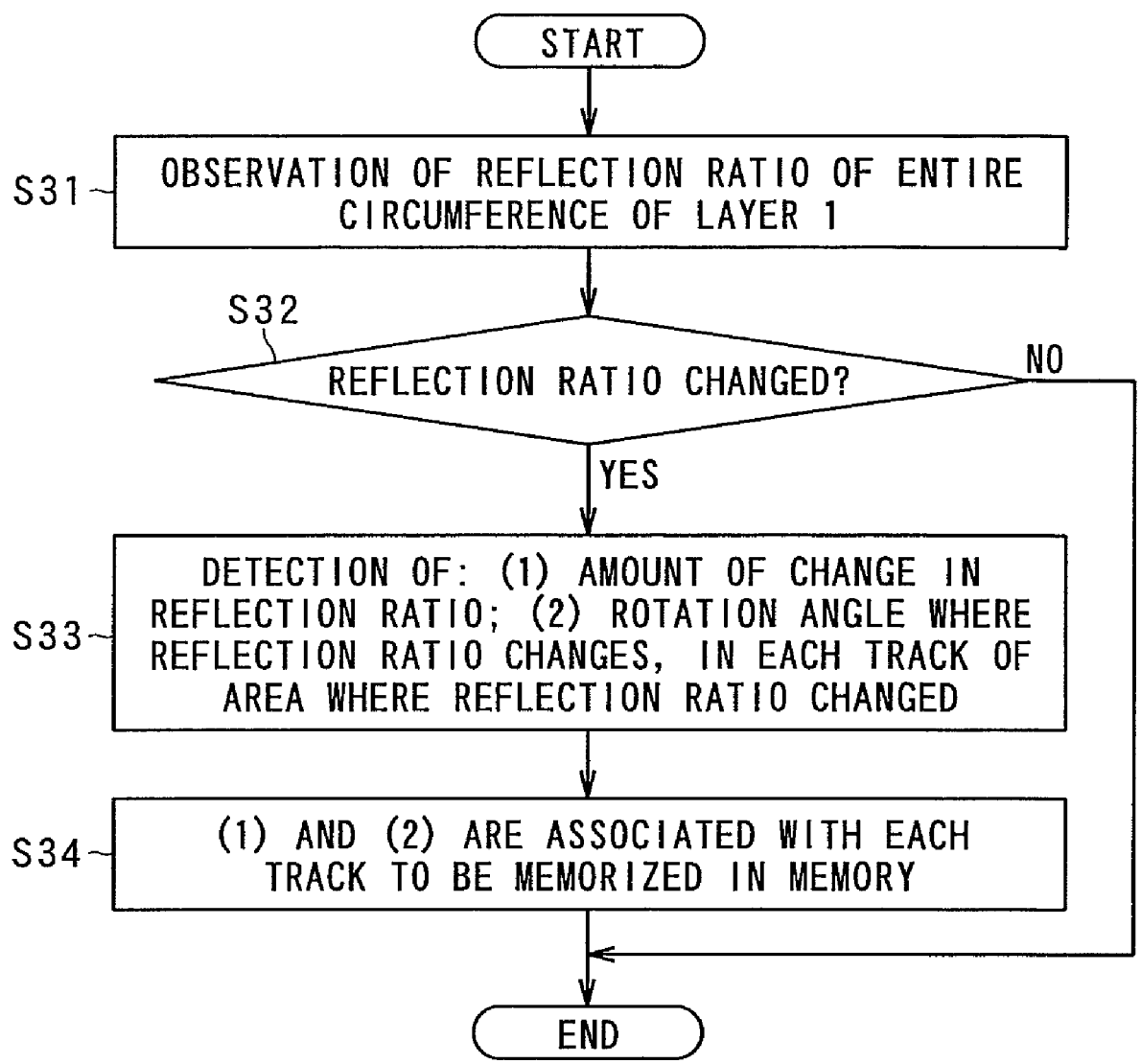

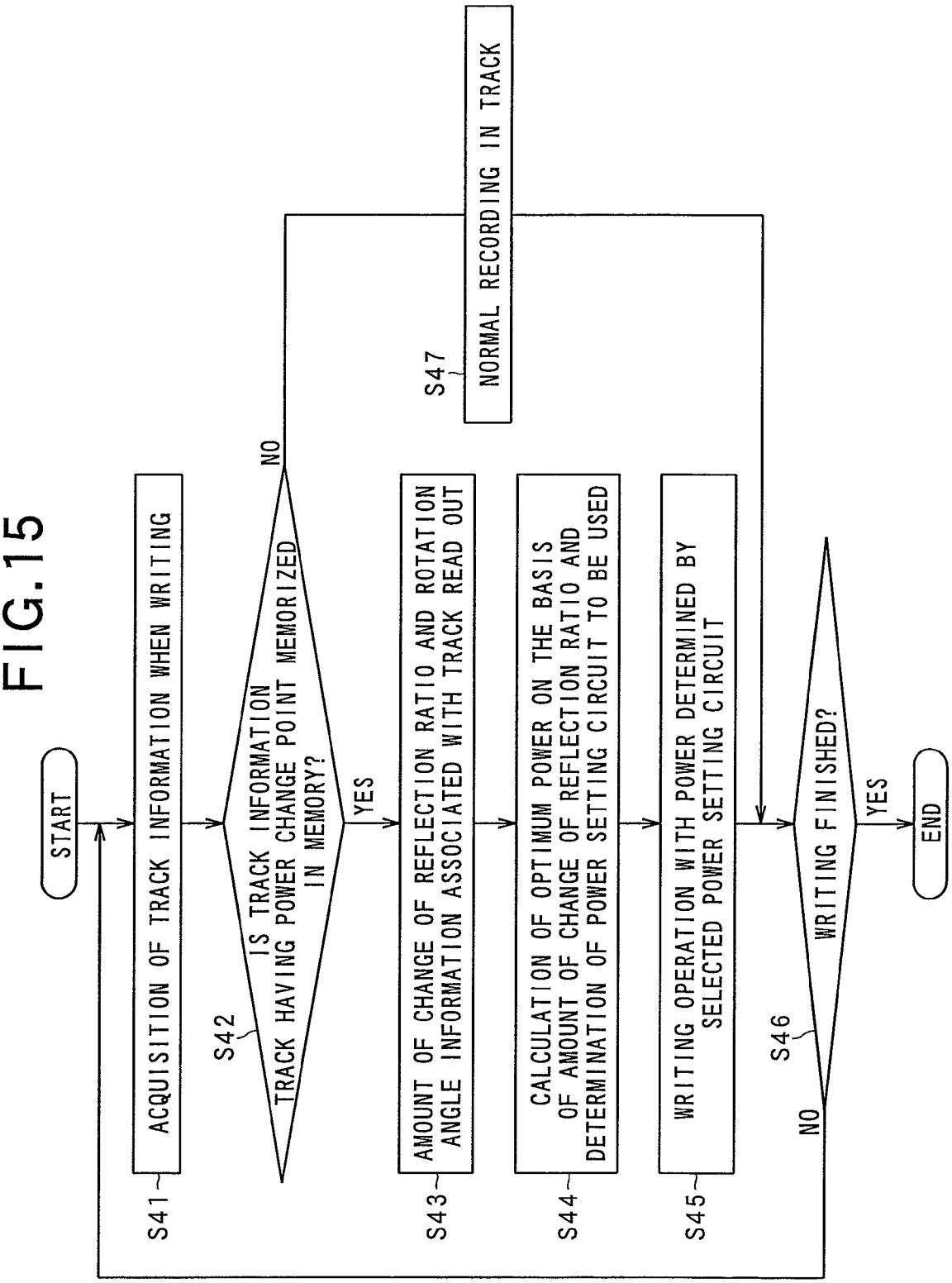

INFORMATION RECORDING/REPRODUCING DEVICE AND THE LIKE

TECHNICAL FIELD

The present application relates to a technical field of an information recording/reproducing device and the like for recording information in an optical medium such as an optical disc or reproducing the information.

BACKGROUND ART

Recently, as an optical medium for recording music information or video information, an optical medium corresponding to regulations of a compact disc (CD), a digital versatile disc (DVD), and the like is being produced. Such an optical medium has a recording layer for recording information and recently an optical medium having the multi-layered recording layers to record large amount of information has been developed.

Conventionally in an optical medium having multi-layered recording layers, assuming that a side on which laser beam is irradiated is upper surface, when given information is recorded in a lower layer recording layer (hereinafter simply referred to as "lower layer"), transmissivity of the beam differs depending on the recording condition of the upper recording layer (hereinafter simply referred to as "upper layer), assuming that a side on which laser beam of the recording layer is irradiated is upper surface. Therefore, there is a case where power of the laser beam irradiated on the recording layer is changed and the given information cannot be appropriately recorded. Moreover, when given information recorded in a lower layer recording layer of an optical medium having multiple layers is reproduced, due to the same reason as the above, there is a case where information cannot be appropriately reproduced.

In such a case, to appropriately record or reproduce the given information to/from the recording layer, an information recording/reproducing device needs to carry out power control of laser beam on the basis of recording condition of the upper layer of the recording layer. Specifically, when recording in a lower layer of recording layers of an optical medium having multi-layered recording layers, the information recording/reproducing device irradiates optical beam to the optical medium and receives optical beam reflected by the optical medium as reflected light to control power of light beam for recording by reflection ratio of the reflected light (Patent Document 1).

Patent Document 1: Japanese Published Unexamined Patent Publication No. 2001-148133

DISCLOSURE OF THE INVENTION

Means To Be Solved By The Invention

However, when a conventional information recording/reproducing device records given information in a lower layer of recording layers of an optical medium, the device carries out recording controlling power of laser beam while recording condition of the upper layer of the recording layer is being taken into consideration. Therefore, it requires time for detecting the recording condition in the data recording time and data cannot be recorded quickly and appropriately.

Specifically, in a case where information is not recorded in, for example, an upper layer, transmissivity of light at the corresponding portion is lowered and therefore to cause laser beam to reach a corresponding portion in a lower layer to record information, power of laser beam must be increased. On the other hand, in a case where information is recorded in an upper layer, transmissivity of light at the corresponding portion is raised and therefore to cause laser beam to reach a corresponding portion in a lower layer to record information, power of laser beam may be low.

Here, an example by an experiment is shown. For example, in a case where information is recorded in a layer L1 of a two-layer disc at 4 times with a recording power of P01=42.0 [mW], if a layer L0 corresponding to the recorded area is in an unrecorded condition, it is possible to carry out recording which can obtain a jitter value of 6.7%, which is a fine characteristic. On the other hand, it is confirmed that if the layer L0 is already in a recorded condition and the recording is conducted under the same condition, a jitter value becomes 9.0% and recording characteristics is worsened. Here, measuring reflection ratio of the layer L1 in which information is to be written in a case where the layer L0 corresponding to the layer L1 is in an unrecorded condition and in a case where the layer L0 corresponding to the layer L1 is in a recorded condition, following results were found.

Reflection ratio of the layer L1 when the layer L0 is in unrecorded condition: R01=17.5%

Reflection ratio of the layer L1 when the layer L0 is in recorded condition: R02=19.1%

Here, it is assumed that the layer L1 is in an unrecorded condition.

In comparison with the above-mentioned R01, reflection ratio of R02 is improved and therefore, it is expected that recording power suitable for recording in the layer L1 corresponding to the area of layer L0 which is in recorded condition is greater than P01. Here, for example, if information is recorded in the layer L1 with the recording power of P02=40.2 mW, a fine result of jitter value of 6.7% can be obtained. In other words, depending on the recording condition of the layer L0, reflection ratio of the layer L1 changes, and therefore when recording in the layer L1, it becomes possible to carry out fine recording by controlling recording power depending on the unrecorded/recorded condition of the layer L0.

When recording of information in an upper layer is carried out from innermost circumference to outer circumference, or from the outermost circumference to inner circumference, a border between part where information of an upper layer is recorded and where information is not recorded is detected and information recording may be carried out in a lower layer by changing power of laser beam on the inner circumference side or outer circumference side as standard. However, center of each layer of a multi-layered recording medium is generally misaligned as an error at manufacturing. Therefore, an upper layer track and a lower layer track do not completely match and due to minute misalignment, while laser beam is irradiated to the lower layer track and the beam makes a round, there is a possibility that both recorded portion in the upper layer and unrecorded portion are passed through. Therefore, corresponding to the recorded portion and unrecorded portion in the upper layer, power of laser beam irradiated to the lower layer track must be adjusted.

To solve such an example of a problem, the present invention is aimed at providing an information recording/reproducing device or the like which can quickly and appropriately record or reproduce given information when the given information is recorded in a lower layer of a recording layer of the optical medium in the optical medium having multi-layered recording layers.

Means for Solving the Problems

To solve above-mentioned problems, an information recording/reproducing device of claim 1 which carries out recording or reproducing data by irradiating laser beam on a recording medium including a plurality of recording layers having a track, is provided with: a rotation device for rotating the recording medium; a light receiving device for receiving reflected light of the laser beam from the recording medium; a detection device for detecting a boundary point on the recording medium where light quantity of the reflected light changes depending on the condition of other recording layer when the laser beam is irradiated on an arbitrary track of a recording layer of the recording medium for recording or reproducing and condition in radial direction of the other recording layer; and a control device for controlling power of the light beam on the basis of the detection result.

To solve above-mentioned problems, an information recording/reproducing method of claim 9 for recording or reproducing data by irradiating laser beam on a recording medium including a plurality of recording layers having a track, is provided with: a light receiving process of rotating the recording medium and receiving reflected light of the laser beam from the recording medium; a detection process of detecting a boundary point on the recording medium where light quantity of the reflected light changes depending on the condition of other recording layer when the laser beam is irradiated on an arbitrary track of a recording layer of the recording medium for recording or reproducing the data and condition in radial direction of the other recording layer; and a control process of controlling power of the light beam on the basis of the detection result.

To solve above-mentioned problems, an information recording/reproducing program of claim 10 for recording or reproducing data by a computer by irradiating laser beam on a recording medium including a plurality of recording layers having a track, causes the computer to function as: a light receiving device for rotating the recording medium and receiving reflected light of the laser beam from the recording medium; a detection device for detecting a boundary point on the recording medium where light quantity of the reflected light changes depending on the condition of other recording layer when the laser beam is irradiated on an arbitrary track of a recording layer of the recording medium for recording or reproducing the data and condition in radial direction of the other recording layer; and a control device for controlling power of the light beam on the basis of the detection result.

BRIEF DESCRIPTION OF THE DRAWINGS

FIG. 9 is a view showing an example of configuration of inside of a memory.

FIG. 14 is a flowchart showing an embodiment for detecting a boundary point where reflection ratio changes.

FIG. 15 is a flowchart showing an embodiment of recording operation.

2: Optical medium;
11: Drive unit;
12: Pickup head;
13: Detection unit;
14: Track position detection unit;
15: Reflected light detection unit;
16: Rotation angle detection unit;
17: Memory; and
18: Recording power controlling unit

THE BEST MODE FOR CARRYING OUT THE CLAIMED INVENTION

Hereinafter, a best embodiment of the present invention will be explained on the basis of attached figures.

—Information Recording/Reproducing Method—

First, an information recording/reproducing method of the present invention will be explained using FIGS. 1 to 6.

Figure 1:
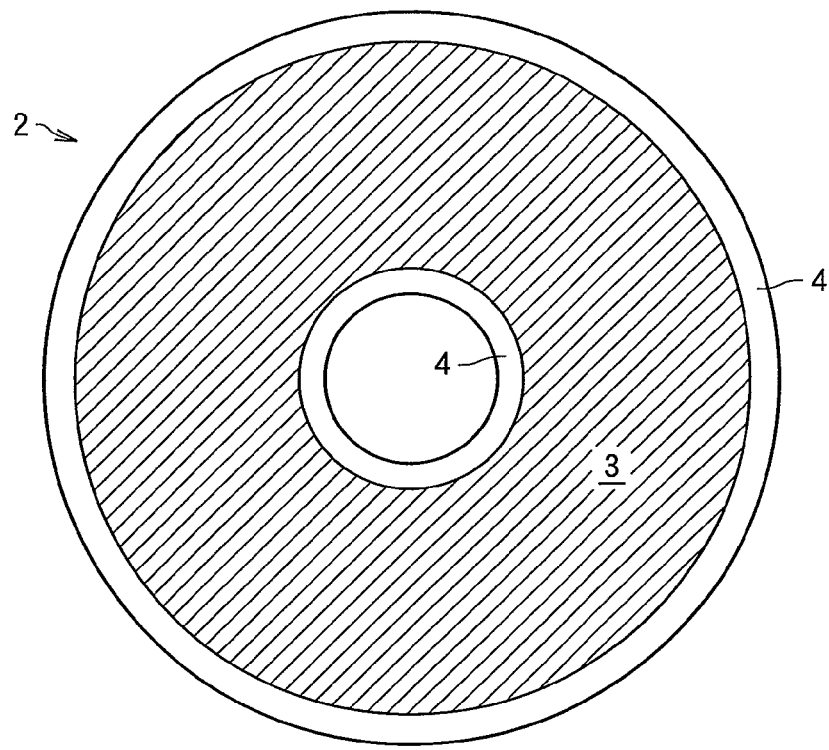
FIG. 1 is a block diagram of an optical medium.
Figure 2:
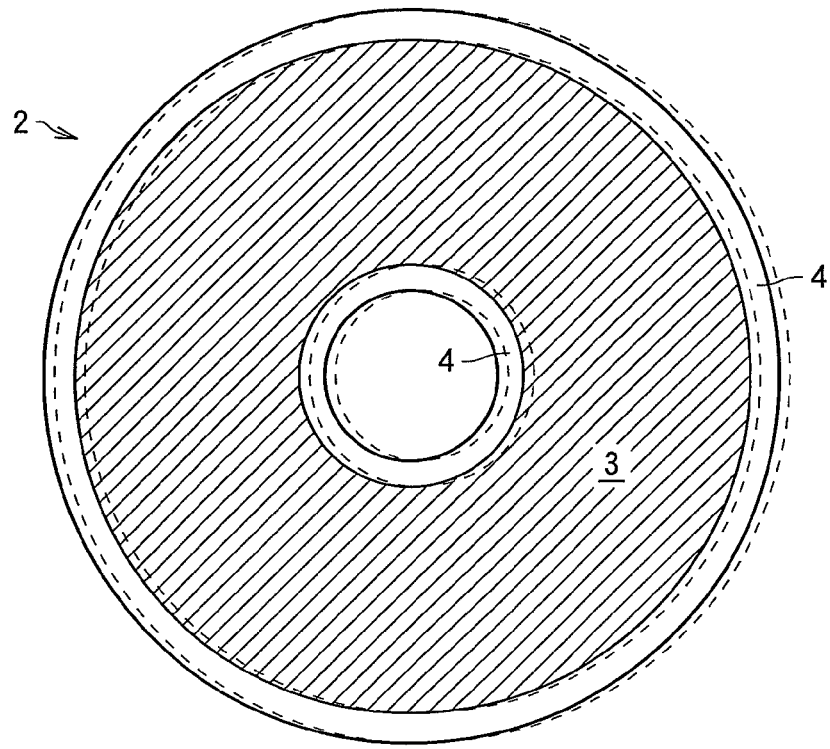
FIG. 2 is a block diagram of an optical medium having two-layered recording layer.
Figure 3:
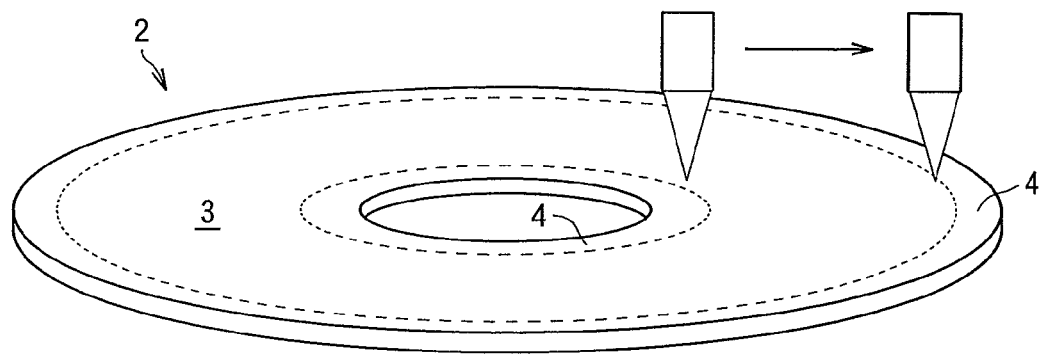
FIG. 3 is a view showing an example of detecting recording condition of the optical medium.
Figure 4:
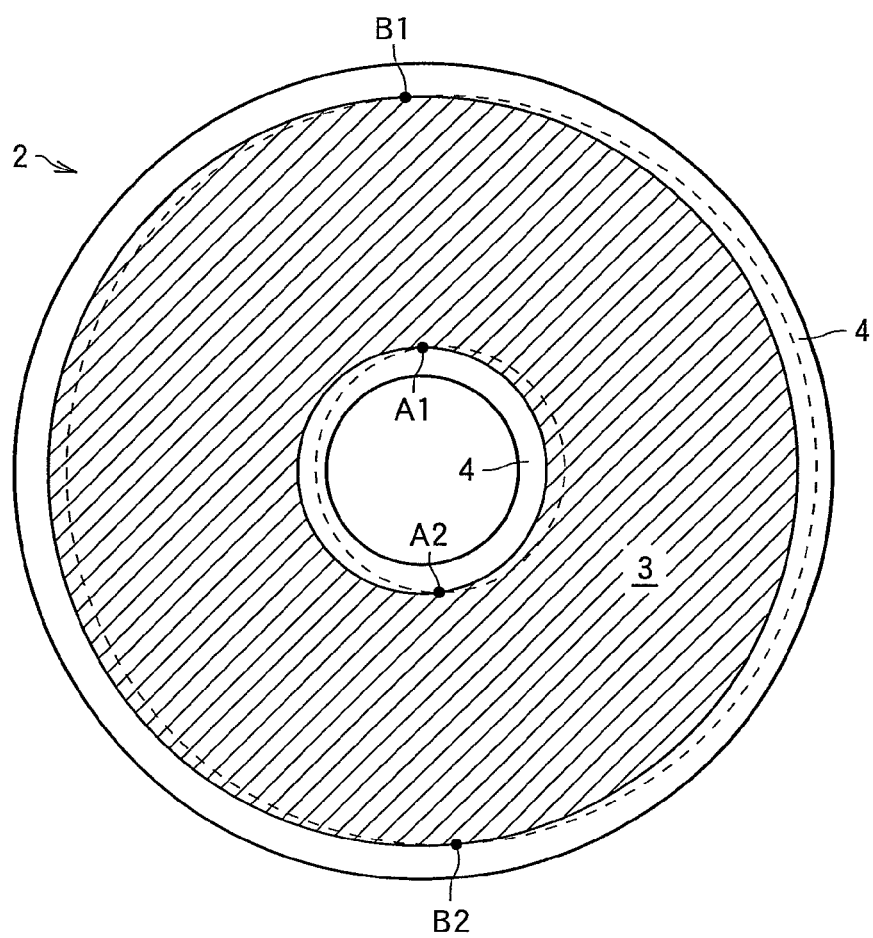
FIG. 4 is a view showing an example of detecting a boundary point where reflection ratio changes.
Figure 5:
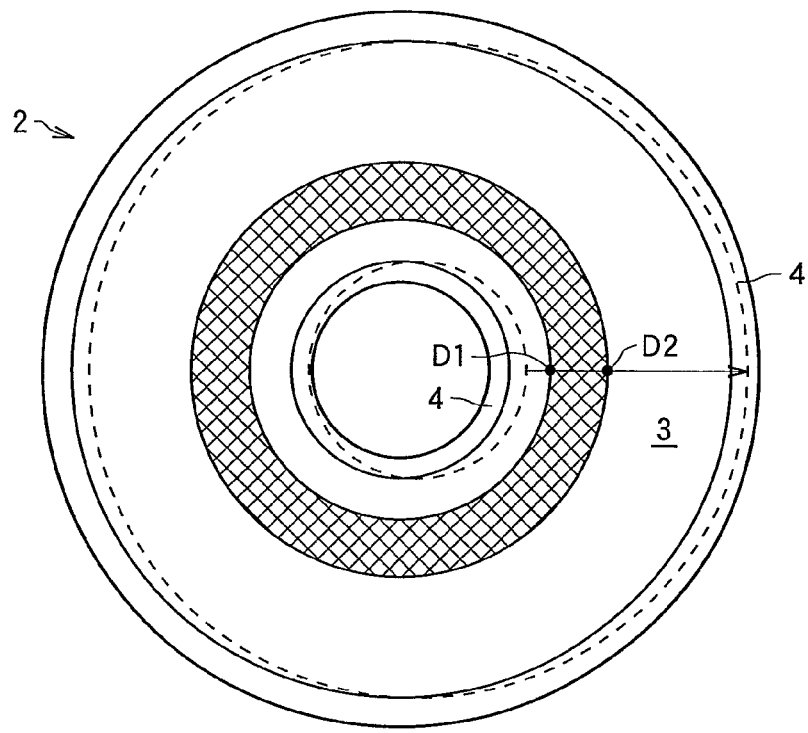
FIG. 5 is a view showing an example of detecting a point where light quantity of reflection ratio changes when laser beam is irradiated to radial direction of a layer 1 in a case where given data are recorded in a layer 0.
Figure 6:
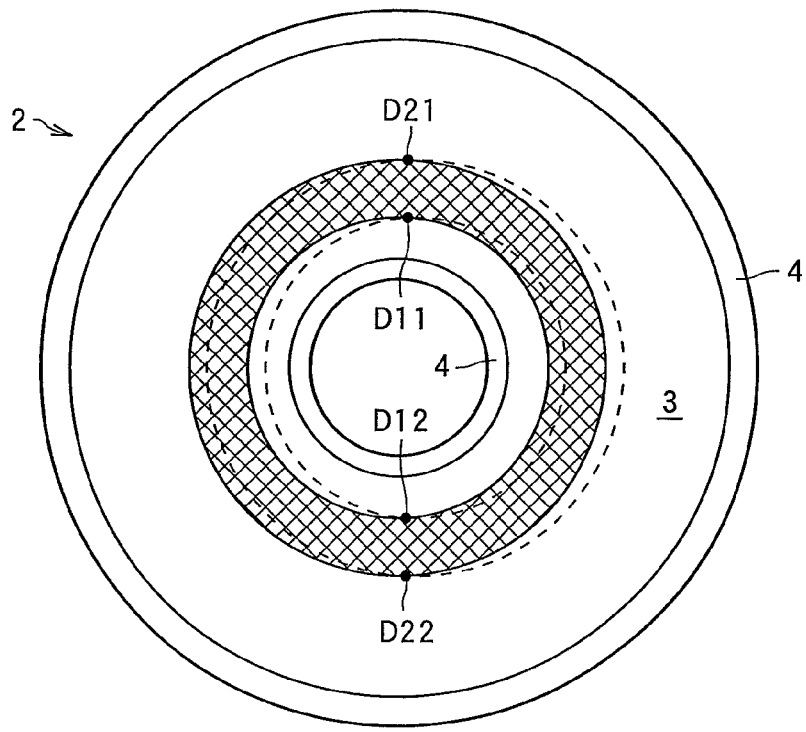
FIG. 6 is a view showing an example of detecting a point where light quantity of reflection ratio changes in a case where given data are recorded in a layer 0.

FIG. 1 is a block diagram of an optical medium, FIG. 2 is a block diagram of an optical medium having a two-layered recording layer, FIG. 3 is a view showing an example of detecting recording condition of the optical medium, FIG. 4 is a view showing an example of detecting a boundary point where reflection ratio changes, FIG. 5 is a view showing an example of detecting a point where light quantity of reflection ratio changes when laser beam is irradiated to radial direction of a layer 1 in a case where given data are recorded in a layer 0, and FIG. 6 is a view showing an example of detecting a point where reflection ratio of the layer 1 changes in a case where given data are recorded in the layer 0.

Here, for easy of understanding, the layer 0 is shown by a solid line and focus tracking trajectory when laser beam is irradiated on the innermost and outermost tracks in the layer 1 to carry out focus tracking is shown by a broken line in FIGS. 2 to 6.

The information recording/reproducing method of the present invention records given data in a recording layer by irradiating laser beam to an optical medium 2 having multi-layered recording layers or reproduces the data from the recording layer where the data is recorded. More specifically, recording condition of the other recording layer provided on the output side of the laser beam instead of an arbitrary layer of the optical medium 2 where recording or reproducing the data is carried out is detected (judged), power of laser beam to be outputted to the arbitrary recording layer is controlled on the basis of the detection result, and given data is recorded or reproduced.

Here, a detection example of the recording condition of the optical medium will be explained.

As shown in FIG. 1, the optical medium 2 includes a recording area 3 where a land or a group is provided and an unrecordable area 4 where a land or a group is not provided. Moreover, the unrecordable area 4 is provided on the outermost portion and the innermost portion of the optical medium 2 and the recording area 3 is provided between the unrecordable area 4 in the innermost portion and the unrecordable area 4 in the outermost portion. Further, the recording area 3 includes a plurality of tracks. Here, the recording area 3 functions as a data area for memorizing information.

When laser beam is irradiated to the optical medium 2, permissivity in the recording area 3 is smaller when compared with that in the unrecordable area 4. This is because a land or a group is provided in the recording area 3 and therefore the laser beam thus irradiated is diffused due to reflection.

In a case where recording layers including such recording area 3 and the unrecordable area 4 are superimposed to make, for example, a two-layered recording layer, misalignment of cores of each recording layer (hereinafter referred to as "misalignment") may occur in the optical medium 2, as shown in FIG. 2. Here in the two-layered recording layer, assumed that a side where laser beam is irradiated is the top surface, a recording layer on the topmost layer is called a layer 0 and a recording layer under the layer 0 is called a layer 1. Moreover, in the following embodiment, explanation will be given on an assumption that given data is recorded in the layer 1.

As mentioned above, when misalignment occurs in each recording layer, if laser beam is irradiated to the layer 1, reflected light quantity of the laser beam differs in the vicinity of boundary between the recording area 3 and the unrecordable area 4 in each recording layer. Therefore, it is required to check to what extent the layer 0 and the layer 1 are misaligned (hereinafter referred to as "degree of misalignment") in the radial direction before starting recording. Specifically, reflection ratio of the outermost track or the innermost track of the layer 1 is monitored, condition of change in reflected light quantity of the laser beam is observed, and the degree of misalignment is calculated on the basis of the result.

For example, as shown in FIG. 3, in a case where laser beam is irradiated from the innermost track of the layer 1, moves to the outermost track (refer to an arrow) and reflected light of the laser beam is measured, reflection ratio in the layer 1 differs depending on whether the right-overhead layer 0 is the recording area 3 or not. That is, when the layer 0 is the recording area 3, permissivity is small while when the layer 0 is the unrecordable area 4, permissivity is large.

Then, as shown in FIG. 4, points where light quantity of reflection ratio changes (A1, A2, B1, and B2) are detected and if recording power is controlled with these points as base points, it becomes possible to stably carry out recording of given data in the layer 1. Moreover, from the center angle generated by connecting the points of the outermost track where the light quantity of the reflection ratio changes (A1 and A2 or B1 and B2) with the center of the layer 0 or the layer 1, it is possible to calculate the degree of misalignment between the layer 0 and the layer 1.

In a case where given data is recorded in a given area of the layer 0, permissivity of laser beam differs in the recording area and the unrecorded area. Therefore, it is necessary to detect a point where reflection ratio changes when laser beam is irradiated and to control recording power with the point as a base point.

Here, depending on the distance between the layer 0 and the layer 1, reflection ratio in the vicinity of the point where the light quantity of the reflection ratio changes may gradually change. In such a case, an optimum recording power to a certain reflection ratio is set as a standard and recording power may be changed according to the change of reflection ratio.

Next, an explanation will be given of an example of detecting a boundary point where light quantity of reflection ratio changes in a case where given data are recorded in a given area of the layer 0.

First, as shown in FIG. 5, an optical pickup (not shown) moves to radial direction of the layer 1 of the optical medium 2 (refer to an arrow) while irradiating laser beam to the layer 1 and change condition in reflection ratio of the laser beam is measured. Then, boundary points (D1 and D2) where the reflection ratio changes are detected.

Next, as shown in FIG. 6, laser beam is irradiated to some tracks in the vicinity of D1 and D2, change condition of reflection ratio of the laser beam is measured, and boundary points where light quantity of the reflection ratio changes (D11, D12, D21, and D22) are detected. Moreover, a boundary point where the reflection ratio changes may be detected for each track in an area where change of the reflection ratio is observed.

Here, in the above-mentioned embodiment, an explanation was given of a case where a total of four boundary points where light quantity of reflection ratio changes exist on two tracks (two points for one track each). However, the number may differ depending on the misalignment condition or recording condition in the layer 0. For example, in a case where data recorded in the layer 0 is recorded from the innermost circumference of the recording area 3 toward outer circumference, two boundary points in one track on outer circumference in radial direction of the layer 1 of the optical medium 2 where light quantity of reflection ratio changes may be detected. Moreover, in a case where recording area of data which are recorded in the layer 0 is narrow (within one track), boundary points where light quantity of reflection ratio changes may be detected only from the track (two points from one track). Further, in a case where the degree of misalignment is for three tracks, boundary points (D11 or the like) shown in FIG. 6 or the like exist in each of the three tracks and each of the boundary points differs in that case.

Next, an explanation will be given of an information recording device to which the information recording/reproducing method of the present invention is applied.

—General Configuration and Operation of Information Recording Device—

First, with reference to FIGS. 7 and 8, configuration and function of an information recording device according to the present embodiment will be explained.

Figure 7:
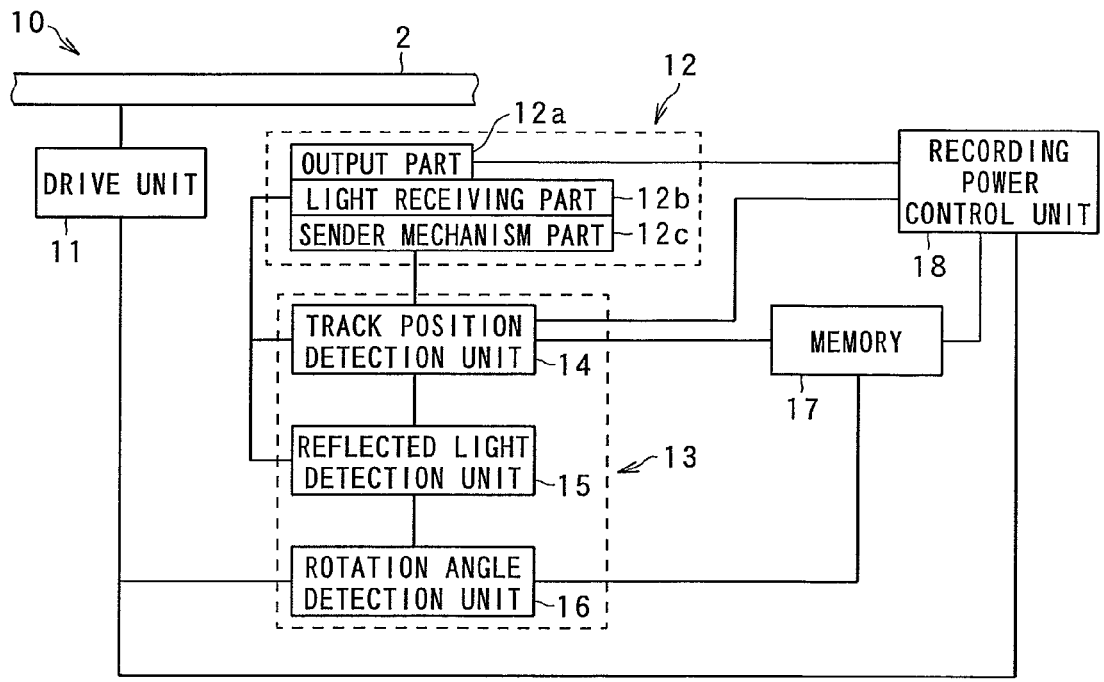
FIG. 7 is a view showing schematic configuration of an information recording device according to the present embodiment.
Figure 8:
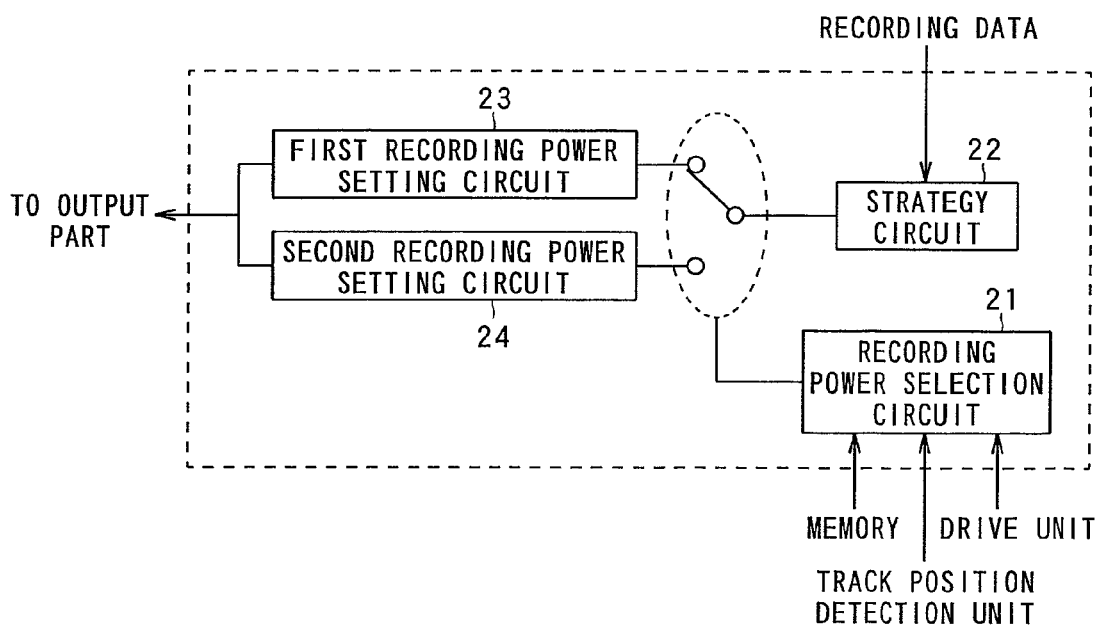
FIG. 8 is a view showing an example of setting of most appropriate recording power on the basis of recording condition of the optical medium.

Here, FIG. 7 is a view showing schematic configuration of an information recording device according to the present embodiment and FIG. 8 is a view showing an example of setting of most appropriate recording power on the basis of recording condition of the optical medium.

In the following explanation, the optical medium 2 includes a plurality of tracks and has a least two layers of recording layers for recording data. Here in the two-layered recording layer, assumed that a side where laser beam is irradiated is the top surface, a recording layer on the topmost layer is called a layer 0 and a recording layer under the layer 0 is called a layer 1. The following explanation will be given on an assumption that each layer has a control information area for recording control information regarding reproducing/recording of the optical medium, a data area for memorizing given information which is formed on external side of outer circumference of the control information area in radial direction and each of the layers are misaligned. Moreover, in the present embodiment, an explanation will be given on an assumption that given information is recorded in an area of the layer 0 of the optical medium 2. As shown in FIG. 7, an information recording device 10 includes: a drive unit 11 for rotary driving the optical medium 2; a pickup head 12 for causing the optical medium 2 to irradiate laser beam to focus the light and at the same time for receiving laser beam reflected by the optical medium 2 as reflected light; a detection unit 13 for detecting a boundary point where reflection ratio from the layer 1 changes and for detecting recording condition in the layer 0; a memory 17 for memorizing information to control power of laser beam on the basis of recording condition of the layer 0; and a recording power controlling unit 18 for controlling power of laser beam when given information is recorded in the optical medium 2. Each component is holistically controlled by a system controller (not shown).

The drive unit 11 is connected to a drive (not shown) having a configuration which enables the optical medium 2 to be mounted in a detachable manner. The drive unit 11 includes a spindle motor for rotary driving the optical medium 2, rotary drives the optical medium 2 under the control of the system controller, and outputs a rotation signal (rotation angle information) to a later-described rotation angle detection unit 16 and the recording power controlling unit 18 when the optical medium 2 is rotary driven.

Here, it is assumed that the rotation signal is outputted from the drive unit 11 and a pulse signal detected at arbitrary time by the rotation angle detection unit 16 is 0 degree of rotation angle of the optical medium 2.

The pickup head 12 includes an output part 12*a*, a light receiving part 12*b*, and a sender mechanism part 12*c*. The output part 12*a* includes, for example, a laser diode and outputs laser beam in response to an instruction from the system controller. Power of the laser beam is controlled by the recording power control unit 18. Moreover, the light receiving part 12*b* includes, for example, a photo detector. The light receiving part 12*b* receives reflected light from the optical medium 2, generates a signal corresponding to the light quantity of the reflected light, and outputs the signal information to a later-described track position detection unit 14 and a reflected light detection unit 15. Further, the sender mechanism part 12*c* moves, for example, the output part 12*a* in radial direction of the optical medium according to an instruction from the system controller. Position information of the output part 12*a* which is moved by the sender mechanism part 12*c* is outputted by the track position detection unit 14 according to an instruction from the system controller.

The detection unit 13 observes the track position detection unit 14 for detecting a position of a track to which laser beam is irradiated and light quantity of reflected light (hereinafter referred to as "reflection ratio") and at the same time includes the reflected light detection unit 15 for detecting change of reflection ratio from the optical medium 2 and the rotation angle detection unit 16 for detecting rotation angle of the optical medium 2.

The track position detection unit 14 reads out positioning sensor (not shown) of the sender mechanism part 12*c* or address information or the like previously written in the optical medium from signal information received by the light receiving part 12*b*, specifies radial position (track) of a track when change in light quantity is detected, and outputs the track information thus specified to the memory 17.

The reflected light detection unit 15 observes reflection ratio from the optical medium 2 on the basis of signal information of reflected light received by the light receiving part 12*b* and at the same time detects amount of change in the reflection ratio to output reflection ratio change information to the rotation angle detection unit 16.

The rotation angle detection unit 16 associates rotation angle of the optical medium 2 and amount of change in reflection ratio at a boundary point where reflection ratio changes on the basis of reflection ratio change information outputted from the reflected light detection unit 15 and rotation angle information outputted from the drive unit 11 and outputs the rotation angle and amount of change in reflection ratio thus associated to the memory 17.

The memory 17 associates and memorizes rotation angle of the optical medium 2 at a boundary point where reflection ratio outputted from the rotation angle detection unit 16 changes, amount of change of the reflection ratio, and track information outputted from the track position detection unit 14. Here, information memorized in the memory 17 is provided to the recording power controlling unit 18 when, for example, information is written in the optical medium. FIG. 9 is a view showing an example of configuration inside the memory.

The memory 17 memorizes information such as at which rotation angle of the drive unit 11 in the rotation of the optical medium 2 toward a track where reflection ratio changes recording power of laser beam needs to be changed.

In the memory 17, as shown in FIG. 9, track information 31 which is information of a track where reflection ratio changes in the optical medium 2, rotation angle information 32 which is information of rotation angle at which amount of reflected light changes on the track shown in the track information 31, and reflection ratio change quantity 33 which is quantity of changed reflected light are memorized. Thus, in a case of, for example, a track number a shown on the top of the figure, following information can be read out: track is a, a boundary point where reflection ratio changes is a point between rotation angle 170 and 190 degree, and amount of change of reflection ratio at a position where rotation angle of the optical medium 2 is between 170 and 190 degree is 30%. Therefore, it is understood that recording power of the laser beam must be changed according to the change of reflection ratio at this rotation angle (between 170 and 190 degree). That is, the recording power controlling unit 18 controls recording power of laser beam at the time of writing on the basis of this information.

Control of recording power at the time of recording is carried out as follows: it is judged whether or not track number corresponding to track number information at the time of writing is memorized in the memory 17; and if the track number is memorized in the memory 17, the recording power controlling unit 18 reads out the information and controls recording power at a rotation angle corresponding to the track number. Thus, it is possible to easily control recording power by reading out recording power at a boundary point where reflection ratio changes at the time of writing. Therefore, it is possible to quickly carry out writing with appropriate power.

In the above-mentioned example, information includes a combination of rotation angle of the optical medium 2 corresponding to a track number where reflection ratio changes and amount of change of reflection ratio. However, the information may include a given zone expressed by an address of the optical medium 2. In this case, for example, power may be changed in a zone between addresses X and Y.

The recording power controlling unit 18 mainly controls recording power of laser beam at the time of recording given recording data. The recording power controlling unit 18 acquires rotation angle of the optical medium 2 which is associated with track information by the memory 17 and amount of change of reflection ratio in response to track position information outputted from the track position detection unit 14 and rotation angle information outputted from the drive unit 11 and outputs information of recording power appropriate for carrying out recording to the output part 12a.

As shown in FIG. 8, the recording power controlling unit 18 includes a recording power selection circuit 21, a strategy circuit 22, a first recording power setting circuit 23, and a second recording power setting circuit 24.

The recording power selection circuit 21 carries out operation for changing recording power (strength) of laser beam outputted from the output part 12a on the basis of track position information outputted from the track position detection unit 14, rotation angle information outputted from the drive unit 11, rotation angle information at a track including a boundary point where reflection ratio changes which is obtained from the memory 17, and reflection ratio change amount information. Specifically, the recording power selection circuit 21 selects whether to carry out recording with recording power set by the first recording power setting circuit 23 or recording power set by the second recording power setting circuit 24.

The first recording power setting circuit 23 is a circuit for setting, for example, an optimum recording power Po1 for recording information in a layer 1 corresponding to an area of a layer 0 of an optical medium where no data is recorded and the second recording power setting circuit 24 is a circuit for setting, for example, an optimum recording power Po2 for recording information in the layer 1 corresponding to an area of the layer 0 of an optical medium where data is recorded.

Information regarding optimum recording power Po1 or Po2 set in the first and the second recording power setting circuits 23 and 24 is outputted to the output part 12a and the output part 12a outputs laser beam having light quantity corresponding to the recording power.

The optimum recording power Po1 and Po2 may be acquired by actually carrying out writing test in an OPC area or the like of an optical medium or may be acquired by calculation on the basis of the optimum recording power Po1. In this case, as an example of a calculation formula, following formula 1 can be taken as an example.

[Number 1]

$$Po2 = Po1\sqrt{Ro1/Ro2} \quad \text{Formula 1}$$

In the formula 1, Ro1 is reflection ratio of laser beam from the layer 1 corresponding to an unrecorded area of the layer 0 and Ro2 is reflection ratio of laser beam from the layer 1 corresponding to an already-recorded area of the layer 0. Moreover, Po1 is optimum recording power for recording information in the layer 1 corresponding to an unrecorded area of the layer 0 of an optical medium.

The system controller includes a central processing unit (CPU) mainly having computing function, a RAM for work, and a ROM memorizing various data or programs. The CPU executes, for example, various programs memorized in the ROM and then controls each part and at the same time holistically controls the information recording device 10.

Specifically, in the present embodiment, the recording power controlling unit 18 detects, for example, recording condition of the layer 0 provided on the output side of laser beam instead of the layer 1 of the optical medium 2 where given recording data is recorded. On the basis of the detection result, the recording power controlling unit 18 gives an instruction for controlling recording power of laser beam for controlling power of laser beam outputted to the layer 1 to record given data.

The drive unit 11 of the present embodiment configures a rotation means of the present invention while the pickup head 12 of the present embodiment configures a light receiving means of the present invention. Moreover, the track position detection unit 14 and the reflected light detection unit 15 of the present embodiment configure a detection means of the present invention while the rotation angle detection unit 16 of the present embodiment configures a rotation angle detection means of the present invention. Further, the recording power controlling unit 18 of the present embodiment configures a control means of the present invention while the memory 17 of the present embodiment configures a memorizing means of the present invention.

In the configuration of the above-mentioned information recording device 10, in a case where, for example, given information is recorded in the layer 0 of the optical medium 2 and given information (recording data) is to be recorded in the layer 1, process which is a characteristic of the present invention will be carried out by the system controller.

Figure 10:
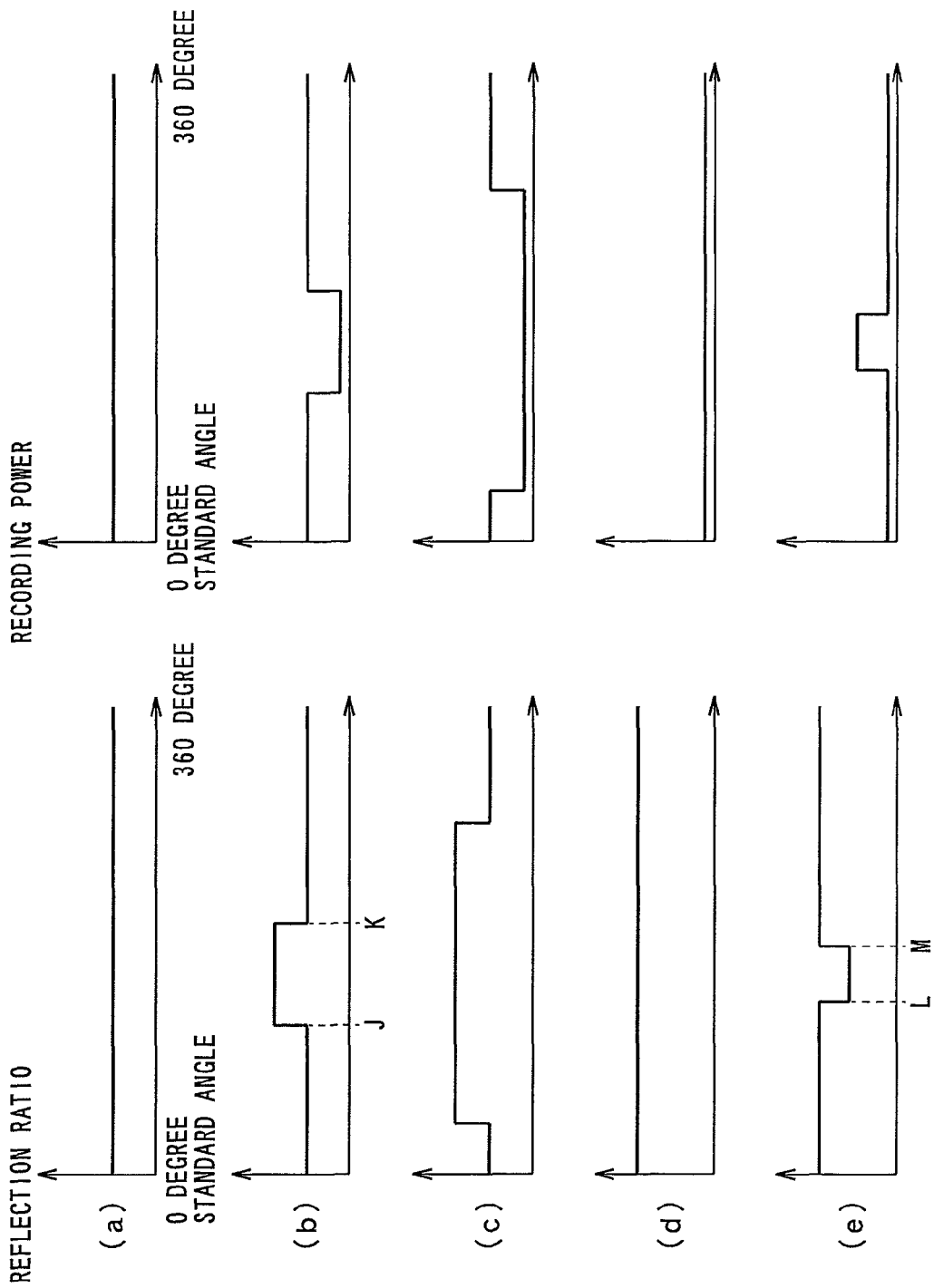
FIG. 10 is a view showing an example of how given recording data is recorded in the layer 1 on the basis of recording condition in the layer 0 of the optical medium.

FIG. 10 is a view showing an example of how given recording data is recorded in the layer 1 on the basis of recording condition in the layer 0 of an optical medium. In the following explanation, for easy of understanding, an explanation will be given with reference to FIG. 6.

In FIG. 10, (A) indicates track position where laser beam is irradiated on an optical medium, (B) indicates change condition of reflection ratio from the layer 1 which is rotating track, and (C) indicates control condition of recording power of the laser beam when recording is carried out.

(B) shows recording condition of the layer 0 and, for example, (a) indicates that the layer 0 corresponding to the layer 1 to which laser beam is irradiated is in unrecorded condition while the layer 1 track makes a round and (d) indicates that the corresponding layer 0 is in recorded condition while the layer 1 track makes a round. Moreover, (b), (c), and (e) indicate that there is an area where reflection ratio changes on the corresponding layer 0. Here, boundary points J and K in (b) is, for example, equivalent to D11 and D12 in FIG. 6, and boundary points L and M in (e) are, for example, equivalent to D21 and D22 in FIG. 6.

The recording power controlling unit 18 controls recording power of laser beam as shown in (C) on the basis of recording condition of the layer 0 shown in (B). Specifically, as illustrated, the recording power controlling unit 18 carries out control of lowering recording power to record in the layer 1 when the layer 0 is in recorded condition (e.g. between J and K in (b)) with the power for recording in the layer 1 when the layer 0 is in unrecorded condition as standard recording power. More specifically, the recording power controlling unit 18 controls recording power with the rotation angle of the optical medium 2 at a boundary point where reflection ratio changes.

Figure 11:
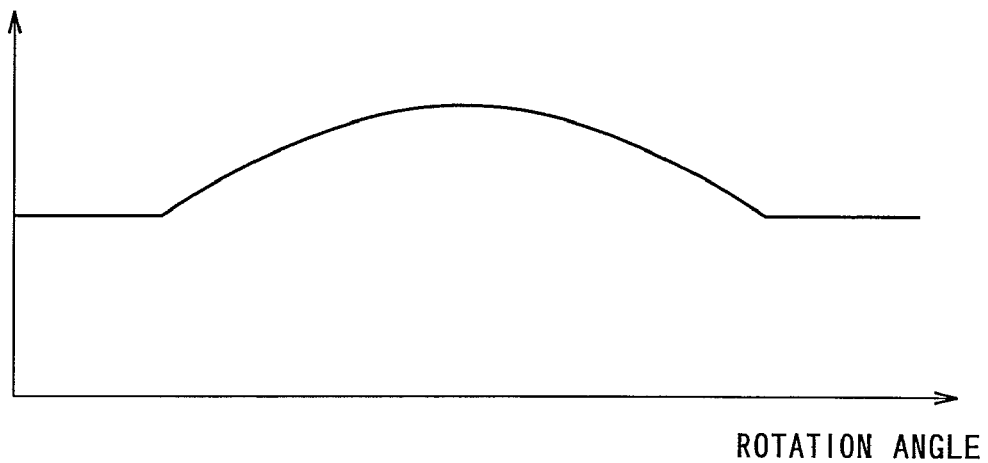
FIG. 11 is a view showing an example of change in reflection ratio in a case where space between layer 0 and layer 1 in the optical medium is large.

Next, FIG. 11 is a view showing an example of change in reflection ratio in a case where space between the layer 0 and the layer 1 in an optical medium is large.

As shown in FIG. 11, depending on the space between the layer 0 and the layer 1, reflection ratio may moderately change in the vicinity of change point where reflection ratio changes. In this case, optimum recording power for certain reflection ratio is set to be a standard and recording power may be changed according to the change of reflection ratio. Specifically, given threshold value (e.g. an average of maximum reflection ratio and minimum reflection ratio) is regulated and recording power is changed when reflection ratio exceeds the threshold value. In the present embodiment, there are two types of recording power set by the recording power controlling unit 18. However, it is possible to deal with the above by setting the recording power more precisely.

OPERATION EXAMPLE

Figure 12:
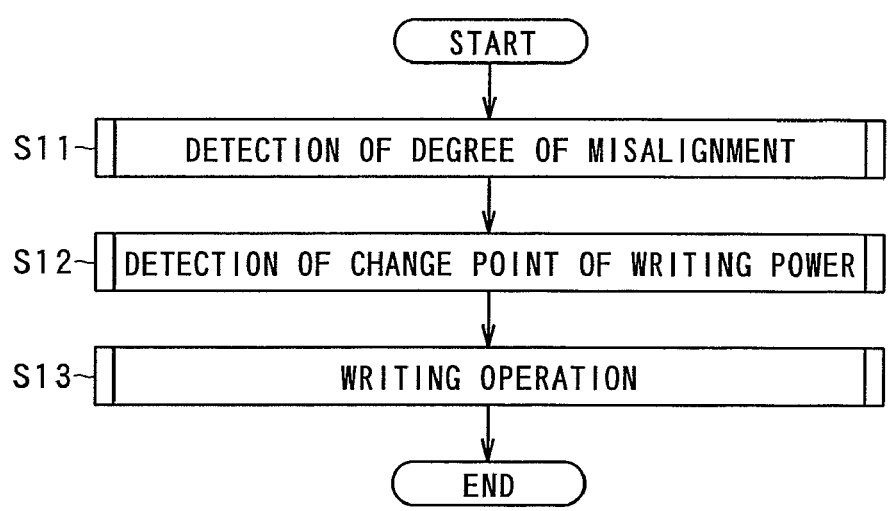
FIG. 12 is a flowchart showing an embodiment of information recording process.
Figure 13:
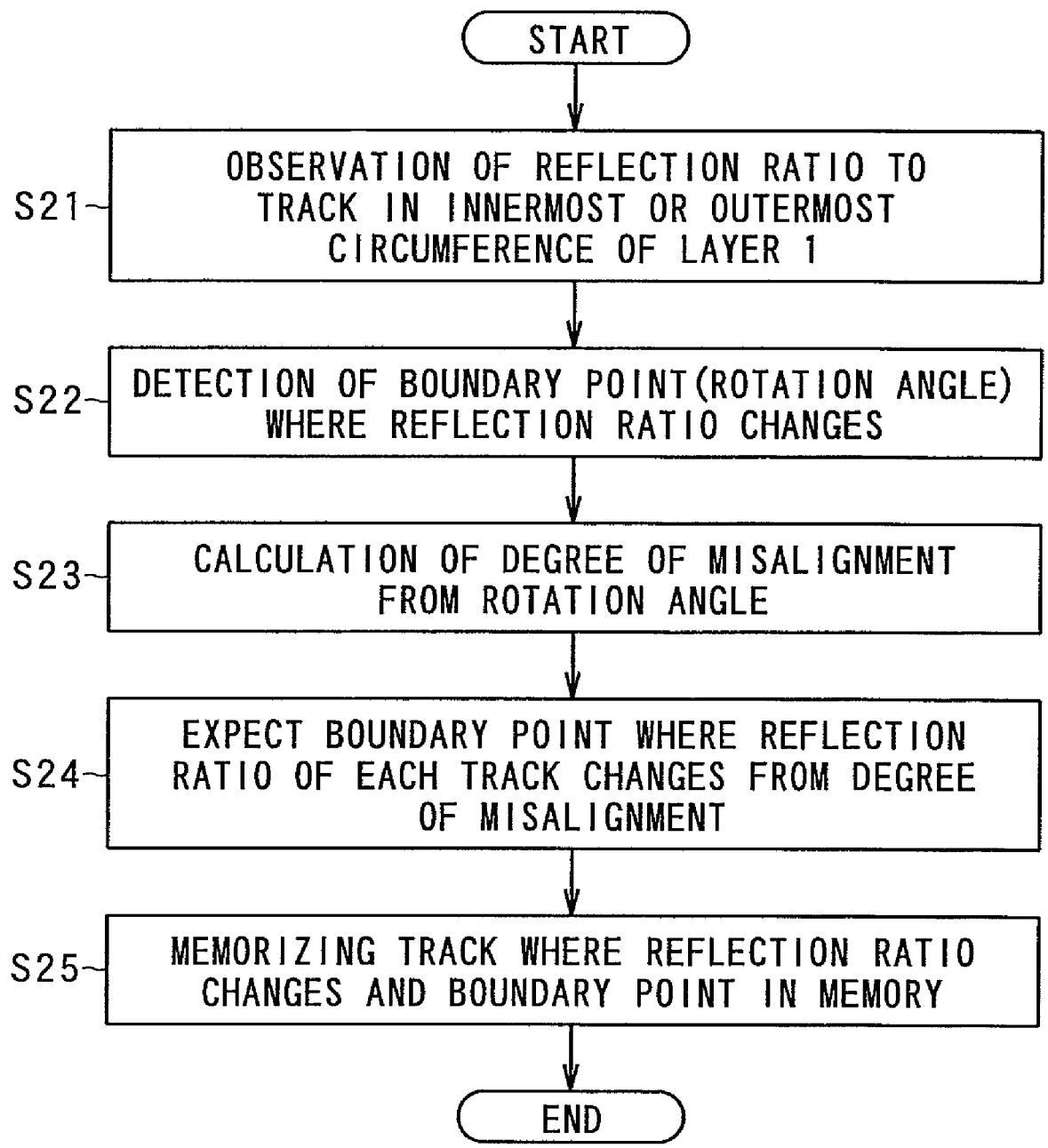
FIG. 13 is a flowchart showing an embodiment for detection of eccentricity quantity.

Next, an operation example of the information recording device according to the present embodiment will be explained using FIGS. 12 to 15. FIG. 12 is a flowchart showing an embodiment of information recording process, FIG. 13 is a flowchart showing an embodiment for detection of misalignment quantity, FIG. 14 is a flowchart showing an embodiment for detecting a boundary point where reflection ratio changes, and FIG. 15 is a flowchart showing an embodiment of recording operation.

In the operation example, the optical medium 2 includes a two-layered recording layer having the layer 0, which is the top layer when it is assumed that the side where laser beam is irradiated is upper surface, and the layer 1 which is a lower layer of the layer 0. In a case where given data is recorded in the layer 1, reflection ratio of the innermost or outermost circumference of the layer 1 during one revolution around the track is detected and rotation angle of the optical medium 2 is detected when reflection ratio of laser beam irradiated on the layer 1 changes. Thereafter, recording condition of the layer 0 is confirmed and a change point of reflected light quantity when laser beam is irradiated on the layer 1 in a case where the layer 0 is in an area in recorded condition. Then, on the basis of the detection result, power of laser beam is controlled and given data is recorded in the layer 1. Here, in the operation example, recording process will be described. However, this can be applied to reproducing process.

In the operation example, given data are recorded in the layer 0 of the optical medium 2 having two-layered recording layer where the layer 1 is provided lower than this layer 0. In a case where given data is recorded in the layer 1, as shown in FIG. 12, amount of misalignment between the layer 0 and the layer 1 is detected (Step S11) and at the same time a boundary point where reflection ratio of laser beam irradiated on the layer 1 changes (border between an area of the layer 0 in recorded condition and an area in unrecorded condition) is detected to detect a change point of recording (writing) power in the layer 1 (Step S12). Then, on the basis of detection result of amount of misalignment and detection result of change point of writing power, power of laser beam is controlled so that given recording data is recorded in the layer 1 (Step S13).

Hereafter, each process of above-mentioned detection operation of the amount of misalignment, detection operation of change point of writing power, and recording operation will be explained using FIGS. 13 to 15. Here, for easy of understanding, reference numerals used in FIGS. 7 and 8 are used. However, the information recording device is not limited thereto.

—Detection Operation Process of Amount of Misalignment—

First, the system controller rotary drives the optical medium 2 by the drive unit 11 with a given rotation number and at the same time causes the pickup head 12 to irradiate laser beam on the innermost or the outermost circumference of the layer 1 to observe information of change of reflection ratio while a track of the innermost or the outermost circumference of the optical medium 2 makes a round (hereinafter referred to as "reflection ratio information") by the light receiving part 12*b* and the reflected light detection unit 15 (Step S21).

Next, reflection ratio information is detected by the reflected light detection unit 15 and by the rotation angle detection unit 16, rotation angle of the optical medium 2 is associated with the reflection ratio information thus detected to detect a boundary point where reflection ratio changes (rotation angle of the optical medium 2) in the layer 1 (Step S22).

Next, the system controller calculates the amount of misalignment between the layer 0 and the layer 1 on the basis of the rotation angle thus detected by the rotation angle detection unit 16 (Step S23) and estimates boundary points where reflection ratio in each track changes in all the tracks of the optical medium (rotation angle of the optical medium 2) from the amount of misalignment (Step S24).

Subsequently, the system controller memorizes in the memory 17 a track where reflection ratio changes and a boundary point where reflection ratio changes in the track (Step S25) and finishes detection process of amount of misalignment.

—Detection Operation Process of Writing Power Change Point (Boundary Point where Reflection Ratio Changes)—

First, the system controller causes the pickup head 12 to move from the innermost circumference to the outermost circumference of the layer 1 using the drive unit 11 and at the same time causes the pickup head 12 to irradiate laser beam on a track and reflection ratio is observed by the light receiving part 12*b* and the reflected light detection unit 15 (Step S31).

Subsequently, the system controller judges whether or not reflection ratio changes while the pickup head 12 is moving (Step S32). If there is any change in reflection ratio, the process proceeds to Step S33. If there is no change in reflection ratio, the process is finished.

Next, regarding each track of the layer 1 in an area where reflection ratio changes, reflection ratio information in a case where the track is caused to make a round while laser beam is irradiated on the layer 1 is detected by the reflected light detection unit 15 to detect amount of change of reflection ratio and at the same time the reflection ratio information thus detected is associated with the rotation angle of the optical medium 2 detected by the rotation angle detection unit 16 to be memorized in the memory 17 (Step S34). Then, detection process of writing power change point is finished.

—Recording Operation Process—

First, the track position detection unit 14 acquires position information of the output part 12*a* from the sender mechanism part 12*c* and detects track information (radial position information of the optical medium 2) to be recorded (Step S41).

Next, the system controller judges whether or not the track where recording is to be carried out is a track having a boundary point (power change point) where reflection ratio memorized in the memory 17 changes (Step S42). If the track have a boundary point, the process proceeds to Step S43. If the track does not have a boundary point, the process proceeds to Step S47 and the recording power controlling unit 18 controls that recording is carried out with normal recording power.

Next, the system controller reads out amount of change of reflection ratio associated with track information memorized in the memory 17 and information of rotation angle of the optical medium 2 at a point where reflection ratio changes (Step S43).

Subsequently, the system controller calculates optimum power on the basis of the amount of change of reflection ratio and the recording power selection circuit 21 determines the recording power setting circuits 23 and 24 to be selected (Step S44) on the basis of the calculated optimum power.

Here, it is assumed that power calculated by the system controller in advance is recorded in the recording power setting circuits 23 and 24. Specifically, for example, optimum power to record in the layer 1 when the layer 0 is in unrecorded condition is set in the recording power setting circuit 23 and optimum power to record in the layer 1 when the layer 0 is in recorded condition is set in the recording power setting circuit 24.

Next, the recording power selection circuit 21 selects the recording power setting circuits 23 and 24 on the basis of information of rotation angle of the optical medium 2 at a point where reflection ratio changes and the output part 12*a* irradiates laser beam to the optical medium 2 with the recording power of a recording power setting circuit thus selected to carry out writing operation of given recording data (Step S45). Specifically, when the layer 0 is in unrecorded condition, laser is irradiated with the power set by the recording power setting circuit 23 and when the layer 0 is in recorded condition, laser is irradiated with the power set by the recording power setting circuit 24.

Next, the system controller judges whether or not writing is finished. When it is judged that writing is finished, writing operation process is finished. When it is judged that writing is not finished, the process proceeds to Step S41 and writing operation process is continued.

In a certain case, writing in a track having a power change point may be controlled not to be carried out or dummy information may be recorded in the track.

This is because it is expected that there is effect in reproducing when information with changed power is recorded in a track. Therefore, depending on a reproduce device, there may be a case where the optical medium 2 recorded by the present method cannot be reproduced.

As explained above, the information recording device 10 is an information recording/reproducing device for carrying out recording or reproducing of data by irradiating laser beam to the optical medium 2 including a plurality of recording layers having tracks and includes: the drive unit 11 for rotating the optical medium 2; the pickup head 12 for receiving reflected light of the laser beam from the optical medium 2; the track position detection unit 14 and the reflected light detection unit 15 for detecting a boundary point where light quantity of reflected light changes when the laser beam for recording or reproducing data is caused to transmit the layer 0 of the optical medium 2 and irradiated on an arbitrary track included in the layer 1 and for detecting recording condition of data in the radial direction of the layer 0; and the recording power controlling unit 18 for controlling the power of the laser beam on the basis of the detection result.

According to this configuration, the information recording device 10 of the present embodiment detects a position between recorded area and unrecorded area of the layer 0 and at the same time detects recording condition in the radial direction of the layer 0 on the basis of the detection result to control power of laser beam for recording in the layer 1 on the basis of the detection result when recording the data.

Therefore, since the power of laser beam is controlled on the basis of recording condition of the layer 0, when given recording data are recorded in the layer 1 of the optical medium 2, laser beam irradiated on the layer 1 of the optical medium 2 is controlled to have appropriate power and recording data can be appropriately recorded.

Moreover, the rotation angle detection unit 16 for detecting rotation angle of the optical medium 2 is further included, the boundary point detected by the detection unit 13 is associated with the rotation angle detected by the rotation angle detection unit 16 at the point of time when the boundary point is detected, and power of the laser beam is controlled by the power controlling unit 18 by the rotation angle.

According to this configuration, the information recording device 10 of the present embodiment associates a position (boundary point) between recorded area and unrecorded area of the layer 0 with the rotation angle of the optical medium 2 and detects recording condition of the layer 0 in the radial direction to control power of laser beam for recording by the rotation angle of the optical medium 2 when recording the data.

Therefore, since power of laser beam is controlled by the rotation angle of the optical medium 2, laser beam irradiated on the layer 1 is controlled to have appropriate power and given recording data can be appropriately recorded.

Moreover, association between the boundary point and the rotation angle is carried out before recording the data.

According to this configuration, the information recording device 10 of the present embodiment associates a boundary point where light quantity of reflected light changes on the basis of recording condition of the layer 0 with the rotation angle of the optical medium 2 before recording data and when data are recorded, power of laser beam for carrying out recording is controlled by the rotation angle of the optical medium 2.

Therefore, since power of laser beam is controlled by the rotation angle of the optical medium 2 associated previously on the basis of recording condition of the layer 0, laser beam is controlled to have appropriate power and it becomes possible to record given recording data quickly and appropriately.

In the present embodiment, an explanation was given on a recording process of information in an optical medium having two-layered recording layer. However, the explanation can be applied to recording process of information in an optical medium having a plurality of recording layers.

For example, in an optical medium 2 including a layer 0, which is the top layer when it is assumed that the side where laser beam is irradiated is upper surface, a layer 1 which is a lower layer of the layer 0, and a layer 2 which is a lower layer of the layer 1, in a case where given recording data are recorded in the layer 2, reflection ratio of the layer 2 is detected and recording condition of the areas in the layer 0 and layer 1 in radial direction are detected. Then, on the basis of the detection result, power of laser beam is controlled and given data are recorded in the layer 2. That is, recording condition of all the areas in radial direction of the layers located on the side where laser is irradiated on the recording layer, where recording is to be carried out, is detected and on the basis of the detection result, power of laser beam is controlled so that given data are recorded in the recording layer.

Moreover, the information recording device of the present embodiment can be applied to an information reproducing device which reproduces information recorded in a lower recording layer in an optical medium having a plurality of recording layers. For example, when reproducing data of an optical medium 2 including multi-layered recording layers, the information reproducing device rotates the optical medium by the drive unit 11 and outputs laser beam to the optical medium 2 by the pickup head 12. The laser beam thus outputted is reflected by the optical medium 2 and information recorded in the optical medium 2 is read out by the light receiving part 12*b*. The information thus read out is D/A converted and outputted as an audio signal. In this case, the information reproducing device controls power of laser beam on the basis of recording condition of other recording layers located on the direction of laser beam irradiated on the recording layer where information to be reproduced is recorded. Specifically, when any information is recorded in another recording layer, the information reproducing device 10 reduces power of laser beam in an area where the information is recorded while when the area is in unrecorded condition, the information reproducing device 10 increases power of laser beam in the area where information is not recorded.

Therefore, on the basis of recording condition of an upper layer of recording layer where given information is recorded, power of laser beam as reflected light when the reflected light reflected by the recording layer is received by the pickup head 12 is controlled and when given data are reproduced, laser beam is controlled to have appropriate power. As a result, it is possible to receive the reflected light appropriately and therefore, it is possible to reproduce the recorded data appropriately.

Moreover, the information recording device of the present embodiment can be applied to an information recording/reproducing device such as a compatible player for recording and reproducing data to an optical medium corresponding to a format of a standard of a CD, DVD, or the like.

Further, as another detection method to detect recorded or unrecorded area of an upper layer of a recording layer, for example, laser beam may be irradiated from the innermost or outermost circumference of the upper layer of the recording layer for each track in radial direction along the whole circumference to detect information of change in light quantity of reflected light reflected by the optical medium 2 and to detect rotation angle of the optical medium 2 at the point of time when the change of quantity of light is detected. Then, on the basis of information thus detected, recording condition of an area in radial direction of the optical medium 2 may be detected with the rotation angle in the upper layer of the recording layer as a standard.

Further, in the present embodiment, an explanation was given in a case where power of laser beam is controlled on the basis of condition of the layer 0 which is upper layer of the layer 1 when recording in the layer 1. However, power of laser beam may be controlled on the basis of condition of a lower layer of the layer to be recorded (e.g. condition of the layer 1 when recording in the layer 0). This is the purpose of preventing effect of reflected light of laser beam which reaches a lower layer of a layer where the laser beam is being focused. For example, laser beam focused and irradiated on the layer 0 reaches the layer 1 and layers lower than the layer 1 after transmitting the layer 0. Then, reflected light from these layers comes back to a pickup. However, because reflected light quantity differs depending on the condition of the layer (recorded/unrecorded), it is possible to say that the quantity of reflected light differs depending on the condition of a lower layer rather than the layer where laser beam is focused. Therefore, by detecting condition of a layer lower than the layer where laser beam is focused and controlling the power of laser beam depending on the condition, it is possible to record or reproduce data more appropriately. It is needless to say that the present invention can be used for that control.

The invention claimed is:

1. An information recording/reproducing device which carries out recording or reproducing data by irradiating laser beam on a recording medium including a plurality of recording layers having a track, comprising:
    a rotation device for rotating the recording medium;
    a light receiving device for receiving reflected light of the laser beam from the recording medium;
    a detection device for detecting a boundary point on the recording medium where light quantity of the reflected light changes depending on the condition of other recording layer when the laser beam is irradiated on a track of an arbitrary recording layer of the recording medium for recording or reproducing and condition in radial direction of the other recording layer;
    a control device for controlling power of the light beam on the basis of the detection result;
    a rotation angle detection device for detecting rotation angle of the recording medium; and
    a memorizing device for associating the boundary point with rotation angle at the point of time when the boundary point is detected and for memorizing the boundary point,
    wherein the control device controls power of the laser beam by the rotation angle at the point of time when the boundary point is detected.

2. The information recording/reproducing device according to claim 1, further comprising:
    an address detection device for detecting an address on the recording medium; and
    a memorizing device for causing the boundary point to be associated with the address at the point of time when the boundary point is detected and for memorizing the boundary point,
    wherein the control device controls power of the laser beam on the basis of the address at the point of time when the boundary point is detected.

3. The information recording/reproducing device according to claim 2,
    wherein the memorizing device associates the change amount of light quantity of the reflected light which changes depending on the condition of the other recording layer to be associated with the address and memorizes the change amount.

4. The information recording/reproducing device according to claim 2,
    wherein the memorizing device memorizes the boundary point and the address associated with the boundary point for each of the tracks.

5. The information recording/reproducing device according to claim 1,
    wherein the memorizing device causes change amount of light quantity of the reflected light which changes depending on the condition of the other recording layer to be associated with the rotation angle memorizes the change amount.

6. The information recording/reproducing device according to claim 1,
    wherein the memorizing device memorizes the boundary point and the rotation angle associated with the boundary point for each of the tracks.

7. The information recording/reproducing device according to claim 6,
    wherein association between the boundary point and the rotation angle is carried out before recording or reproducing the data.

8. An information recording/reproducing method for recording or reproducing data by irradiating laser beam on a recording medium including a plurality of recording layers having a track, comprising:
    a light receiving process of rotating the recording medium and receiving reflected light of the laser beam from the recording medium;
    a detection process of detecting a boundary point on the recording medium where light quantity of the reflected light changes depending on the condition of other recording layer when the laser beam is irradiated on a track of an arbitrary recording layer of the recording medium for recording or reproducing the data and condition in radial direction of the other recording layer;

a control process of controlling power of the light beam on the basis of the detection result;

a rotation angle detection process of detecting rotation angle of the recording medium; and a memorizing process of associating the boundary point with rotation angle at the point of time when the boundary point is detected and for memorizing the boundary point, wherein power of the laser beam by the rotation angle at the point of time when the boundary point is detected, is controlled in the control process.

9. A non-transitory recording medium on which an information recording/reproducing program is recorded so as to be read out by a computer, the program controlling irradiating laser beam on a recording medium including a plurality of recording layers having a track, causing the computer to function as:

a light receiving device for rotating the recording medium and receiving reflected light of the laser beam from the recording medium;

a detection device for detecting a boundary point on the recording medium where light quantity of the reflected light changes depending on the condition of other recording layer when the laser beam is irradiated on a track of an arbitrary recording layer of the recording medium for recording or reproducing the data and condition in radial direction of the other recording layer;

a control device for controlling power of the light beam on the basis of the detection result;

a rotation angle detection device for detecting rotation angle of the recording medium; and a memorizing device for associating the boundary point with rotation angle at the point of time when the boundary point is detected and for memorizing the boundary point, wherein the control device controls power of the laser beam by the rotation angle at the point of time when the boundary point is detected.

10. An information recording/reproducing device which carries out recording or reproducing data by irradiating laser beam on a recording medium including a plurality of recording layers having a track, comprising:

a rotation device for rotating the recording medium;

a light receiving device for receiving reflected light of the laser beam from the recording medium;

a detection device for detecting a boundary point on the recording medium where light quantity of the reflected light changes depending on the condition of other recording layer when the laser beam is irradiated on a track of an arbitrary recording layer of the recording medium for recording or reproducing and condition in radial direction of the other recording layer;

and a control device for controlling power of the light beam on the basis of the detection result;

an address detection device for detecting an address on the recording medium; and a memorizing device for causing the boundary point to be associated with the address at the point of time when the boundary point is detected and for memorizing the boundary point, wherein the control device controls power of the laser beam on the basis of the address at the point of time when the boundary point is detected.

\* \* \* \* \*